No. 797,131. PATENTED AUG. 15, 1905.
S. P. LERCH.
HAY ELEVATOR.
APPLICATION FILED FEB. 16, 1905.

2 SHEETS—SHEET 1.

WITNESSES
Jos. J. Hosler
L. M. Bond

INVENTOR
Samuel P. Lerch
BY F. W. Bond
ATTORNEY

No. 797,131. PATENTED AUG. 15, 1905.
S. P. LERCH.
HAY ELEVATOR.
APPLICATION FILED FEB. 16, 1905.

2 SHEETS—SHEET 2.

WITNESSES:
Jos. J. Hosler.
L. M. Bond.

INVENTOR
Samuel P. Lerch
BY F. W. Bond
ATTORNEY

UNITED STATES PATENT OFFICE.

SAMUEL P. LERCH, OF CANTON, OHIO.

HAY-ELEVATOR.

No. 797,131.          Specification of Letters Patent.          Patented Aug. 15, 1905.

Application filed February 16, 1905. Serial No. 245,825.

*To all whom it may concern:*

Be it known that I, SAMUEL P. LERCH, a citizen of the United States, residing at Canton, in the county of Stark and State of Ohio, have invented certain new and useful Improvements in Hay-Elevators; and I do hereby declare that the following is a full, clear, and exact description of the same, reference being had to the annexed drawings, making a part of this specification, and to the numerals of reference marked thereon, in which—

Figure 1:
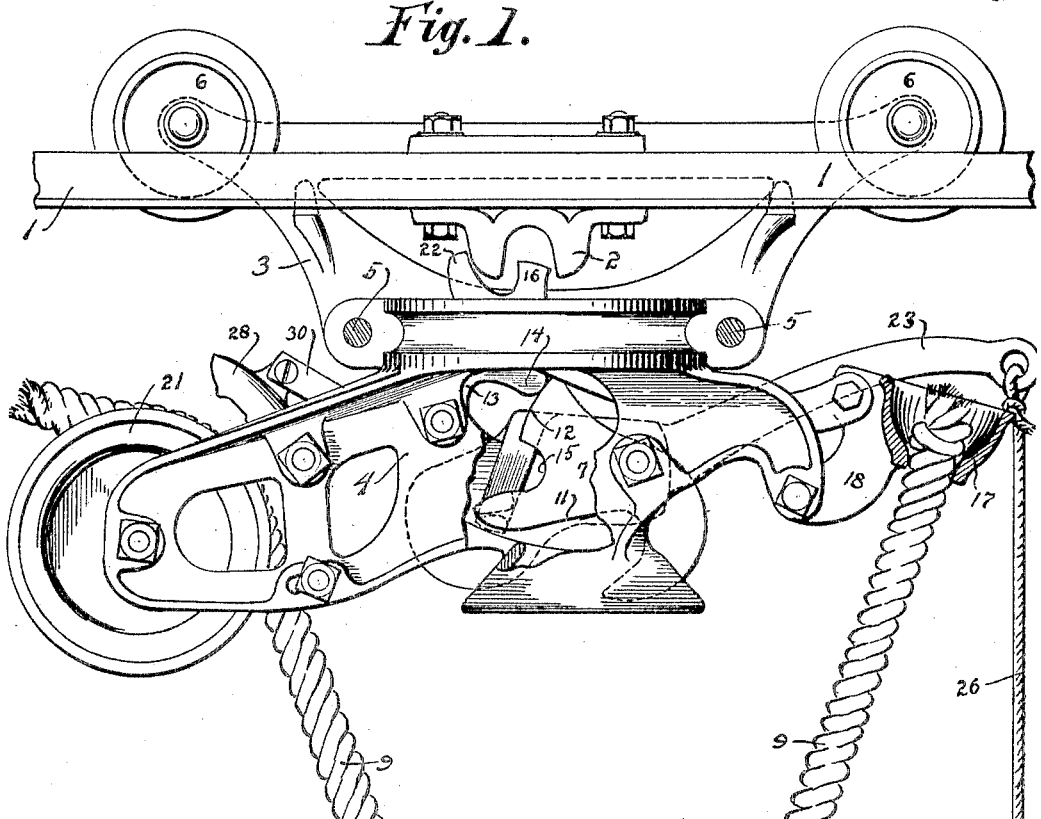
Figure 2:
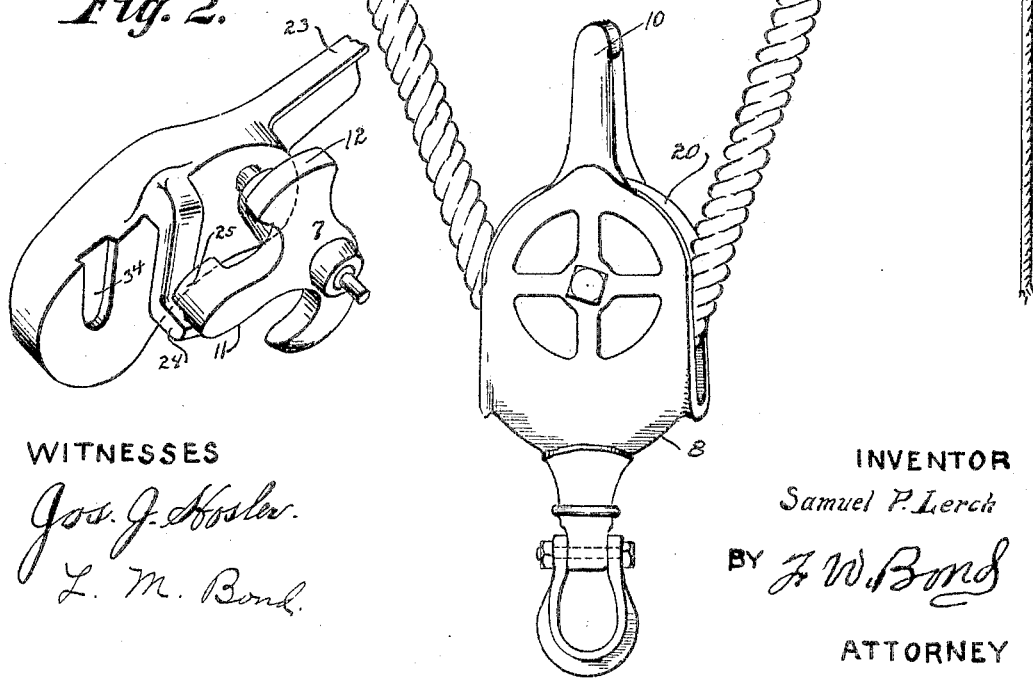
Figure 3:
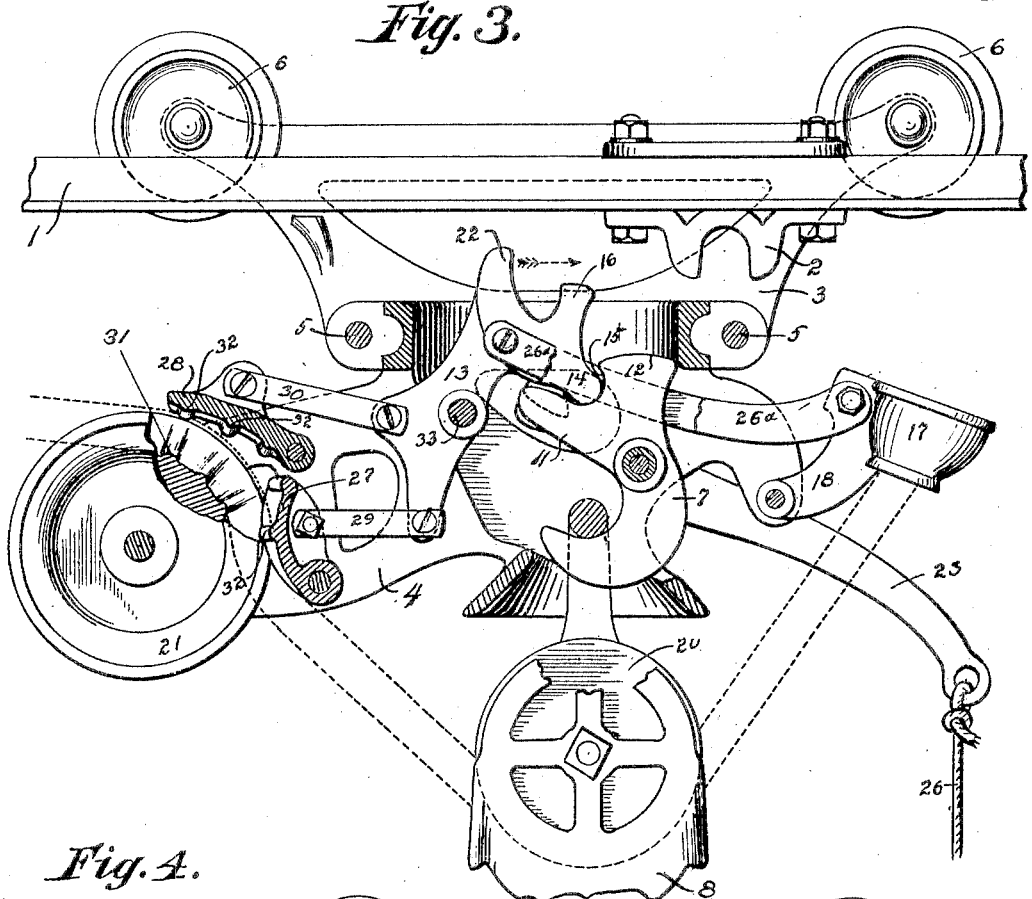
Figure 4:
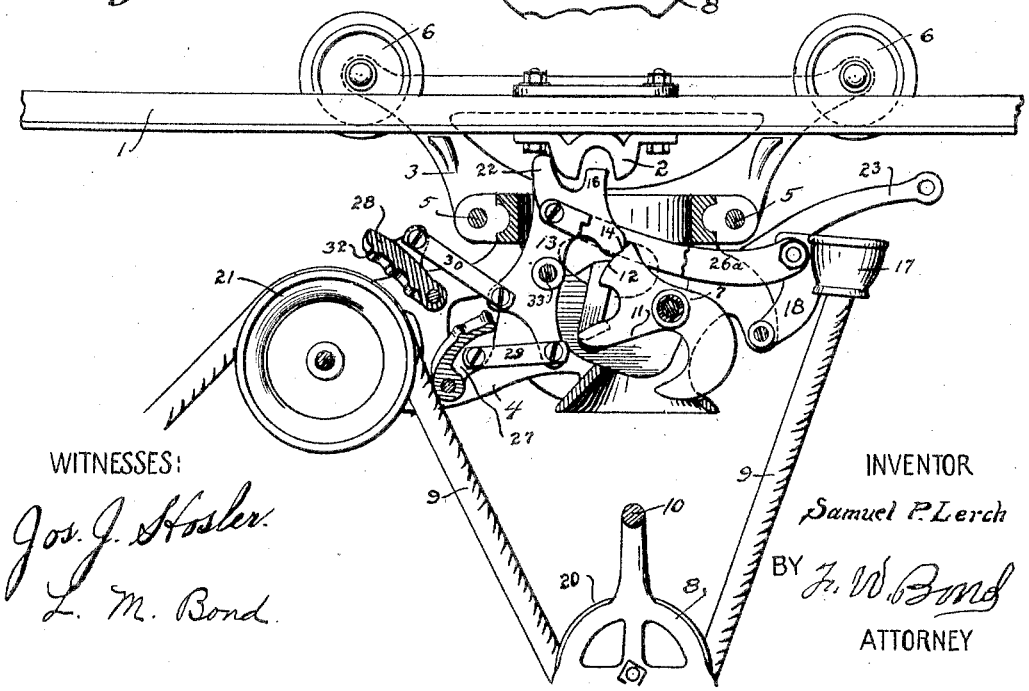

Figure 1 is a side elevation showing parts in section and in dotted lines and illustrating the carriage locked to the track. Fig. 2 is a perspective view of the elevating-head locking-dog and a fragmentary view of the releasing-lever, showing the two parts in proper relative position. Fig. 3 is a vertical section showing the carriage proper released from the track and the elevating-head locked or connected to the carriage. Fig. 4 is a similar view, except the elevating-head is disconnected and the carriage locked to the track.

Similar numerals of reference indicate corresponding parts in all the figures of the drawings.

In the accompanying drawings, 1 represents the track or way, which is suspended in the usual manner and is provided with the stop-block 2, which stop-block is secured to the track at a point directly above where it is desired to stop the carriage proper when it is desired to connect a load to the carriage. The carriage proper consists of two parts 3 and 4, the part 3 being the upper one and the part 4 the lower one, said parts being swiveled together in the usual manner. The upper part 3 is preferably formed in two halves or members and the members connected together by suitable clamping-bolts 5.

Each member of the upper part 3 is provided with the traveling wheels 6, which wheels are fitted to travel back and forth upon the track or way 1. This construction, however, is common in hay-elevators of this class, and no detailed description other than just above given is deemed necessary. The lower part 4 is provided with the connecting and locking dog 7, which dog is pivotally connected and its lower hooked end so located that when the elevating-head 8 is brought upward by means of the elevating-rope 9 the top of the upward extension 10 will come in contact with the lateral arm 11, which rocks the dog 7 and throws the hooked end through the upward extension 10, thereby connecting the elevating-head 8 to the carriage proper.

When the dog 7 is rocked so as to throw the lower hooked end of said dog through the extension 10, the upper portion 12 of the dog 7, located above its pivotal point, is moved away and out of contact with the rock-bar 13, which allows the rock-bar 13 to move upon its pivotal point and permit the lateral arm 14 to drop into the recess 15, formed in the locking-dog 7, and thereby lock the dog 7 against any rocking or oscillating movement. As the rock-bar 13 moves so as to drop the arm 14 into the recess 15 the extension 16 is detached from the stop-block 2, at which time the carriage proper is released and is free to travel with its connected load upon the track or way 1.

To the lower member 4 is pivotally attached the elevating-rope-connecting head 17 by means of the arm 18, and the elevating-rope 9 is attached to the head 17, which elevating-rope extends downward and under the pulley 20 and the elevating-head 8, thence upward and over the pulley 21, and thence to the place where power is to be applied.

It will be understood that during the time the load is being elevated and while the carriage is locked upon the track there can be no movement of the locking-dog 7 until the extension 10 comes in contact with the arm 11, by which arrangement the carriage is held locked to the track until the load is properly connected. When the carriage is returned, the extension 22 comes in contact with the stop-block 2, which lifts the lateral arm 14 out of the recess 15 and allows the dog 7 to swing or rock and disconnect the extension 10 from said dog and at the same time bring the upper end 12 under the arm 14, which locks the carriage to the stop-block 2. In use it is frequently desirable to release the carriage from the stop-block before the load has become fully elevated, and in order to accomplish this the trip-lever 23 is provided, which trip-lever is pivoted in axial alinement with the dog 7, said trip-lever being provided with the flange 24, which flange is so arranged that it will come in contact with the side flange 25, formed upon the arm 11, and by a downward pull of the trip-lever 23 by means of the trip-rope 26 the dog 7 will be rocked in substantially the same manner that it is by the extension 10, which allows the lateral arm 14 to drop into the recess 15 and release the carriage from the track, after which the carriage is free to travel upon the track, together with the load, regardless of its point of elevation.

For the purpose of gripping the elevating-rope upon the pulley 21 at the time the carriage is released from the stop-block of the track the links 26ª are pivotally connected to the top or upper end of the arm 18 and to the rock-bar 13 above its pivotal point, by which arrangement a down pull of the elevating-rope will rock the rock-bar 13, which in turn moves the lower end of the rock-bar 13 toward the pulley 21, and by providing the rope-grips 27 and 28 and connecting said rope-grips to the links 29 and 30 and connecting said links to the bottom or lower portion of the rock-bar 13 said grips 27 and 28 will be forced upon the elevating-rope 9, and thereby prevent any movement of the elevating-rope except as it moves with the carriage.

For the purpose of providing proper leverage the grips 27 and 28 are pivoted to the lower carriage member 3 and the links 29 and 30 pivoted to the grips at a point located at one side of the pivotal points of said grips. For the purpose of insuring proper frictional contact and to prevent any accidental slipping of the elevating-rope the convexed face of the grip 27 is located against the elevating-rope and the concaved side of the grip 30 against the elevating-rope, by which arrangement a perfect and complete grip is produced; but when the carriage is locked to the track the pull of the elevating-rope will not effect the grips 27 and 28, owing to the fact that the head 12 of the dog holds the bar 13 stationary. For the purpose of preventing any slipping of the rope upon the grooved pulley 21 the groove of said pulley is provided with the radial ribs 31, and of course ribs 32 should be formed upon the grips 27 and 28.

It will be understood that the trip-lever 23 should be weighted at its opposite end from that to which the trip-rope is attached, so that when the down pull of the trip-lever is released its weighted end will drop automatically after it has acted upon the dog 7. In order that the trip-lever 23 may lie close to the face of the lower carriage member 4 and at the same time clear the head of the bolt 33, said lever is provided with the recess 34.

Having fully described my invention, what I claim as new, and desire to secure by Letters Patent, is—

1. In a hay-elevator, the combination of a track or way, a carriage provided with traveling wheels, and the carriage adapted to travel back and forth upon the track or way, a stop-block secured to the track or way, and the carriage consisting of members swiveled together, the lower member of said carriage provided with a dog adapted to engage the extension of the elevating-head, said dog provided with a recess located above its pivotal point, a rock-bar pivoted to the lower member of the carriage, and provided with an arm adapted to be received in the recess of the dog, a rope-attaching head connected to a pivoted arm, links connected to the arm and to the rock-bar, links connected to the rock-bar below its pivotal point, said links connected to grips and the grips adapted to clamp the elevating-rope when the carriage is released from the stop-block, substantially as and for the purpose specified.

2. In a hay-elevator, the combination of a track or way, and a stop-block secured to said track or way, a carriage consisting of upper and lower parts and the upper and lower parts swiveled together, a locking-dog carried by the lower part of the carriage, a rock-bar provided with extensions at its upper end, said extensions adapted to engage the stop-block, links pivotally attached to the bottom or lower portion of the rock-bar, grips pivotally attached to the lower part of the carriage, a pulley journaled to the lower part of the carriage and adjacent the grips, and the lower links of the rock-bar pivotally connected to the grip, a rope-connecting head pivotally attached to the lower part of the carriage, and links connected to the arm of the rope-connecting head and to the rock-bar, and means for locking the dog in engagement with the extension of the elevating-head, substantially as and for the purpose specified.

3. In a hay-elevator of the class described, the combination of a track or way and a stop-block, a carriage adapted to travel thereon, said carriage consisting of members swiveled together, the lower member thereof provided with a locking-dog and a rock-bar, a pulley journaled to the lower part of the carriage and grips located adjacent the pulley, and links connected to the grips and to the rock-bar, a rope-attaching head held in pivotal relation with the lower member of the carriage, and links connected to the rope-connecting head and to the rock-bar, substantially as and for the purpose specified.

4. In a hay-elevator, the combination of a track or way and a stop-block, a carriage adapted to travel upon the track or way, said carriage consisting of upper and lower parts, and the upper and lower parts swiveled together, an elevating-head provided with an extension, a locking-dog provided with a lateral arm, and the lateral arm provided with a side flange, a trip-lever pivoted to the lower member of the carriage and said trip-lever provided with a flange adapted for contact with the flange upon the dog, an elevating-rope, and means for gripping the rope by the down pull of the elevating-rope, substantially as and for the purpose specified.

In testimony that I claim the above I have hereunto subscribed my name in the presence of two witnesses.

SAMUEL P. LERCH.

Witnesses:
J. A. JEFFERS,
F. W. BOND.